Aug. 31, 1937.   G. SUNDBACK   2,091,617
METHOD OF MANUFACTURING SEPARABLE INTERLOCKING FASTENERS
Original Filed July 10, 1933
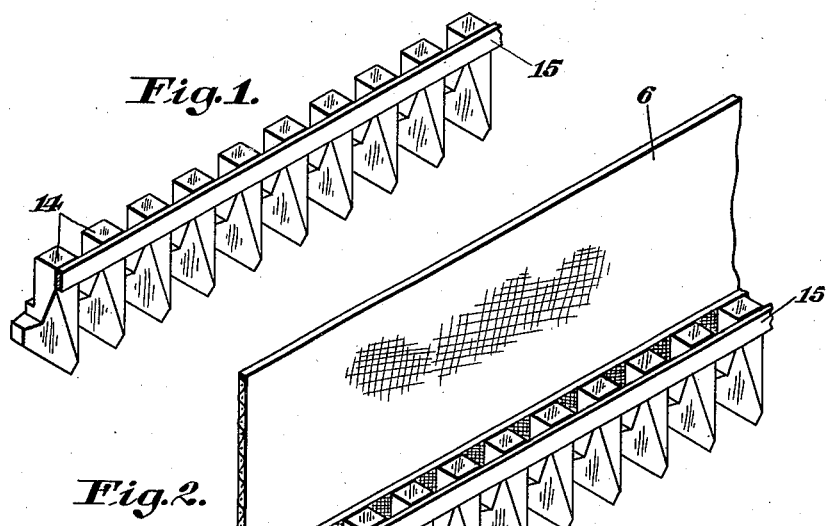
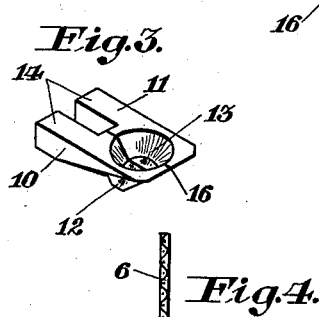
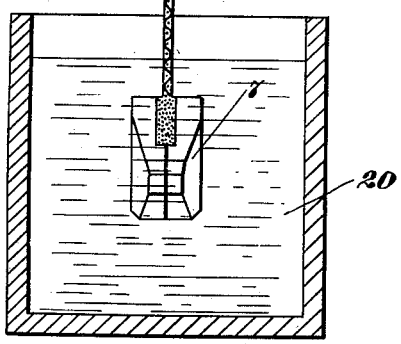
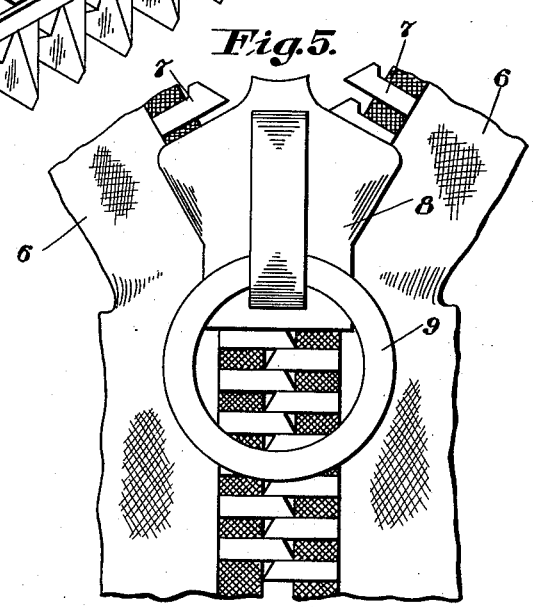
INVENTOR.
Gideon Sundback
BY Kelley & Chisholm
ATTORNEYS.

Patented Aug. 31, 1937

2,091,617

UNITED STATES PATENT OFFICE 2,091,617

METHOD OF MANUFACTURING SEPARABLE INTERLOCKING FASTENERS

Gideon Sundback, Meadville, Pa., assignor to Hookless Fastener Company, Meadville, Pa., a corporation of Pennsylvania Application July 10, 1933, Serial No. 679,690
Renewed January 24, 1936

5 Claims. (Cl. 18—59)

This invention relates to separable interlocking fasteners and particularly to fasteners having cooperating series of closely and uniformly spaced fastener members made from non-metallic material and attached to flexible supports such as fabric tapes.

One of the objects of my invention is to provide an improved method for making such fasteners and particularly for assembling the non-metallic members on their flexible supports.

Another object of my invention is to provide an improved method of forming the fastener members.

Still another object is to provide improved method of holding said fastener members in spaced relation while they are assembled on a flexible support.

Other objects and advantages of the invention will hereinafter more fully appear.

In the accompanying drawing I have shown for purposes of illustration and description one embodiment which my invention may assume in practice. In this drawing:

Fig. 1 is a perspective view of a strip made in accordance with my invention before attachment to the flexible support;

Fig. 2 is a perspective view of the flexible support and fastener strips assembled;

Fig. 3 is a perspective view of an individual fastener member;

Fig. 4 illustrates one step in my improved method; and

Fig. 5 is a general view of the complete fastener.

The shape of fastener member illustrated is one which has been successfully used in metallic fasteners but it will be understood that the type of fastener member may be varied widely within the scope of my invention.

As illustrated the fastener comprises a pair of flexible supports, herein fabric tapes 6, having fastener members 7 attached thereto. The fastener members are brought together and interlocked or disengaged by movement of a slider 8 which is actuated by a pull tab 9. It is desirable to make the fastener members of materials which are of light weight, and capable of being produced in any desired color to match the material of the article in which the fastener is used. One good example of such material is pyroxylin although it will be understood that my invention is applicable to fastener members of any suitable material.

Referring to Fig. 3, each fastener member comprises a plurality of sections 10, 11 which when joined together form a projection 12, recess 13 and a pair of spaced apart arms 14. Such fastener member sections are preferably connected together temporarily in strip form as indicated in Fig. 1. This may be accomplished by sticking them to a thin strip 15 of soluble material such as a very thin sheet of pyroxylin or other cellulosic material. The members can be stuck to the strip by first softening the surface of the strip with solvent. The fastener member strips are next placed on the tape as shown in Fig. 2. This is also preferably accomplished by sticking, that is, by the use of cement, glue, or other bonding material or by softening the surfaces of the members sufficiently to cause them to adhere to the tape. If the fastener members are made of soluble material, the tape or the fastener members may have solvent such as acetone applied thereto which will soften the inner surface of the attaching arms sufficiently to cause them to adhere to the fabric. Whether or not the members are of soluble material, a suitable cementing and bonding material may be used between the attaching arms and the tape, or if desired, heat may be applied to effect the union. The fastener member sections may be stuck together along the line 16 also by the use of cement, heat, or solvent.

The removal of the temporary strip 15 may be accomplished by various means such as cutting and brushing away. Preferably, however, the strip is removed by dipping the assembled sections in a solvent bath 20 as indicated in Fig. 4. Since the strip is thin it will dissolve away before the fastener members are dissolved even though the fastener members be made of soluble material. This dipping operation also acts to smooth up the corners and sharp edges of the fastener members. After drying for a suitable time the fastener strips are preferably put between pressure plates or rolls to make the surfaces entirely smooth and to produce uniformity in size.

While I have shown and described in this application one embodiment which my invention may assume in practice, it will be understood that this description is only for the purposes of illustration and that various other forms may occur to those skilled in the art.

What I claim as my invention is:

1. A strip for use in the manufacture of separable fasteners of the class described comprising a plurality of fastener member sections, a thin connecting strip of soluble material stuck to each of said fastener member sections to hold them in uniformly spaced arrangement until they are assembled with a flexible support.

2. In the manufacture of separable interlocking fasteners, forming strips of connected fastener member sections wherein the connections are of soluble material, attaching said strips to a flexible support so that said sections fit together to form complete fastener members, and separating said fastener member sections after attachment to the flexible support by dissolving said soluble material.

3. In the manufacture of separable interlocking fasteners, the fastener members of which have an interlocking projection and a recess on opposite sides of the member, and a pair of spaced arms for attaching the member to a flexible tape, forming fastener member sections each of which contains a portion of said recess and head, two of said sections adapted to fit together to form a complete fastener member, and attaching said sections to a flexible tape and to each other.

4. In the manufacture of separable interlocking fasteners, the fastener members of which have an interlocking projection and recess on opposite sides of the member, and a pair of spaced arms for attaching the member to a flexible tape, forming fastener member halves each of which has one arm and one half of the interlocking projection and recess, sticking said fastener member sections together, and simultaneously sticking the attached arms to a tape.

5. In the manufacture of separable interlocking fasteners, forming strips of connected fastener member sections wherein the connections are of removable material, attaching said strips to a flexible support so that said sections fit together to form complete fastener members, and separating said fastener member sections after attachment to the flexible support by removing the material of said connections.

GIDEON SUNDBACK.